United States Patent
Jericijo

[11] 3,888,528
[45] June 10, 1975

[54] HATCH BATTENING DEVICE
[75] Inventor: Boris Jericijo, Hisings Backa, Sweden
[73] Assignee: von Tell Trading Co. AB, Sweden
[22] Filed: May 3, 1973
[21] Appl. No.: 356,821

[30] Foreign Application Priority Data
May 8, 1972 Sweden.............................. 6016/72

[52] U.S. Cl. ...... 292/256.5; 114/203; 292/DIG. 49; 292/113
[51] Int. Cl............................................ B63b 19/14
[58] Field of Search .......... 292/256.5, 110, 113, 64, 292/66, 17, DIG. 49; 114/203

[56] References Cited
UNITED STATES PATENTS

| 2,017,564 | 10/1935 | Claud-Mantle | 292/110 |
| 2,679,427 | 5/1954 | Johnson | 292/110 |
| 2,954,252 | 9/1960 | Carpenter | 292/110 |
| 3,164,403 | 1/1965 | Jerome et al. | 292/256.5 |
| 3,696,774 | 10/1972 | Ostrem | 292/256.5 |
| R27,276 | 1/1972 | Erickson | 292/113 |

FOREIGN PATENTS OR APPLICATIONS

| 86,204 | 5/1962 | France | 114/203 |
| 549,989 | 2/1923 | France | 292/DIG. 49 |

Primary Examiner—Roy D. Frazier
Assistant Examiner—Peter A. Aschenbrenner
Attorney, Agent, or Firm—Harness, Dickey & Pierce

[57] ABSTRACT

A battening device for cargo hatches comprising a preferably hydraulically operated hook member engaging with a pin on the hatch. Link arms and a vertical guide member are provided, ensuring tight engagement between the hook member and the pin while at the same time eliminating sliding friction between the hook member and the pin and thus excessive wear.

3 Claims, 6 Drawing Figures

HATCH BATTENING DEVICE

BACKGROUND OF THE INVENTION

The present invention concerns a device for hatch battening operations, particularly a battening device intended for ship cargo hatches, and comprising a hook member arranged by means of one of its ends to engage over a pin attached on the hatch. The hook member is connected to a source of power via an arm which is pivotally mounted on a shaft supported on a frame, the coaming, carrying the hatch. The battening device also comprises means arranged to guide the hook member during the battening operation in such a manner that the hook portion thereof will perform a circumscribing movement around the hatch pin and finally tighten the hatch pin in a direction towards the arm pivot shaft on the coaming. In a known battening device of this type one has, however, found that the wear on the hook portion and the hatch pin is considerable, even after short use only. The reason herefore is that when performing its circumscribing movement the hook portion of the hook member slides against the hatch pin. On account of the comparatively large forces involved the function and thus also the wear become considerable.

SUMMARY OF THE PRESENT INVENTION

The purpose of the present invention is primarily to obviate this disadvantage. It is characteristic of the invention that the hook member end opposite the hook portion is articulated to the upper end of a link the lower end of which is articulated to the free end of the pivotally mounted arm, and in that the upper end of said link is slidingly guided in an essentially vertical guide member on the coaming. Owing to this arrangement, the hook portion of the hook member will, after completion of the circumscribing movement of the hook member, perform a vertical movement downwards towards the hatch pin. This eliminates the sliding friction between the hook portion and the hatch pin during the battening operation proper.

BRIEF DESCRIPTION OF THE DRAWINGS

Further characteristics of the invention will become apparent upon reading of the following detailed description with reference to the accompanying drawings, wherein.

DETAILED DESCRIPTION OF A PREFERRED EMBODIMENT

Figure 1:
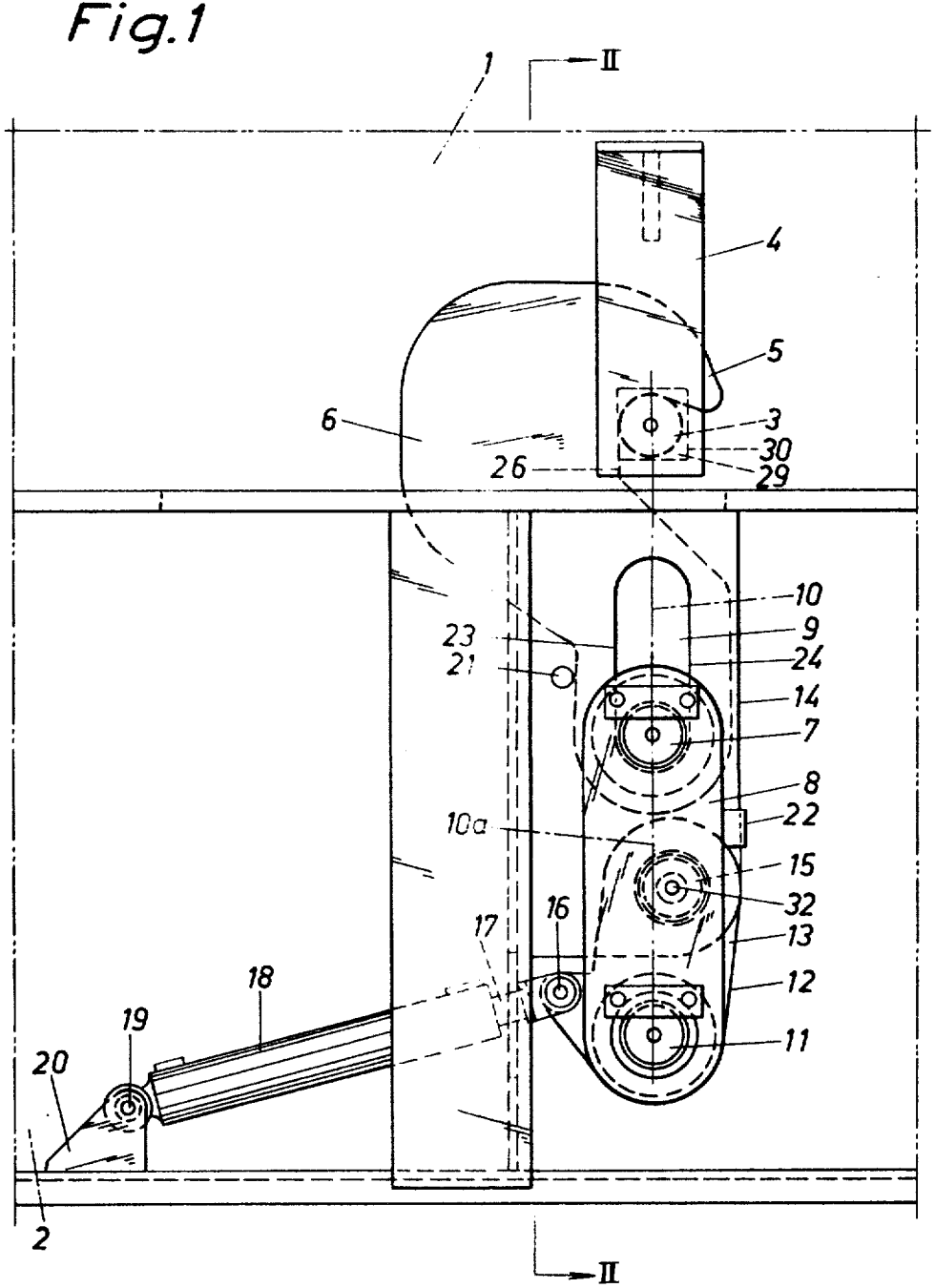
FIG. 1 is a side view of the battening device in battening position.

In the drawings the hatch has received reference numeral 1 and the hatch coaming numeral 2. The hatch 1 is provided with a pin 3 of a nature to be described more in detail in the following, said pin being attached in a horizontal position in a hatch mounting 4. The hook-shaped portion 5 at the upper end of a hook member 6 is arranged to cooperate with said pin. The lower end of said member 6 is by means of a pin 7 articulated to the upper end of a link 8, the ends of said pin 7 passing through two guide channels 9 formed in the coaming 2. An imaginary line 10 extending in the longitudinal direction of the guide channels 9 intersects the hatch pin 3. The lower end of the link 8 is provided with a pin 11 which articulates the link with the free end 12 of an arm 13 the opposite end of which being pivotally mounted about a pivot pin 15 attached to two parallel stays 14 on the hatch coaming 2. The arm 13 is articulated at 16 to the piston 17 of an hydraulic cylinder unit 18 which at 19 is articulated to a bracket 20 on the hatch coaming 2.

The coaming 2 is provided with a guide pin 21 against which pin the hook member 6 slides during movement. The link 8 is provided with a stopper means 22 cooperating with the stays 14 to limit the swinging movement of the link in the battening position in which an imaginary line 10a between the two articulation points 7 and 11 falls to the left of the centre of the pivot axis 15. This arrangement provides for self-blocking in the battening position.

Figure 3:
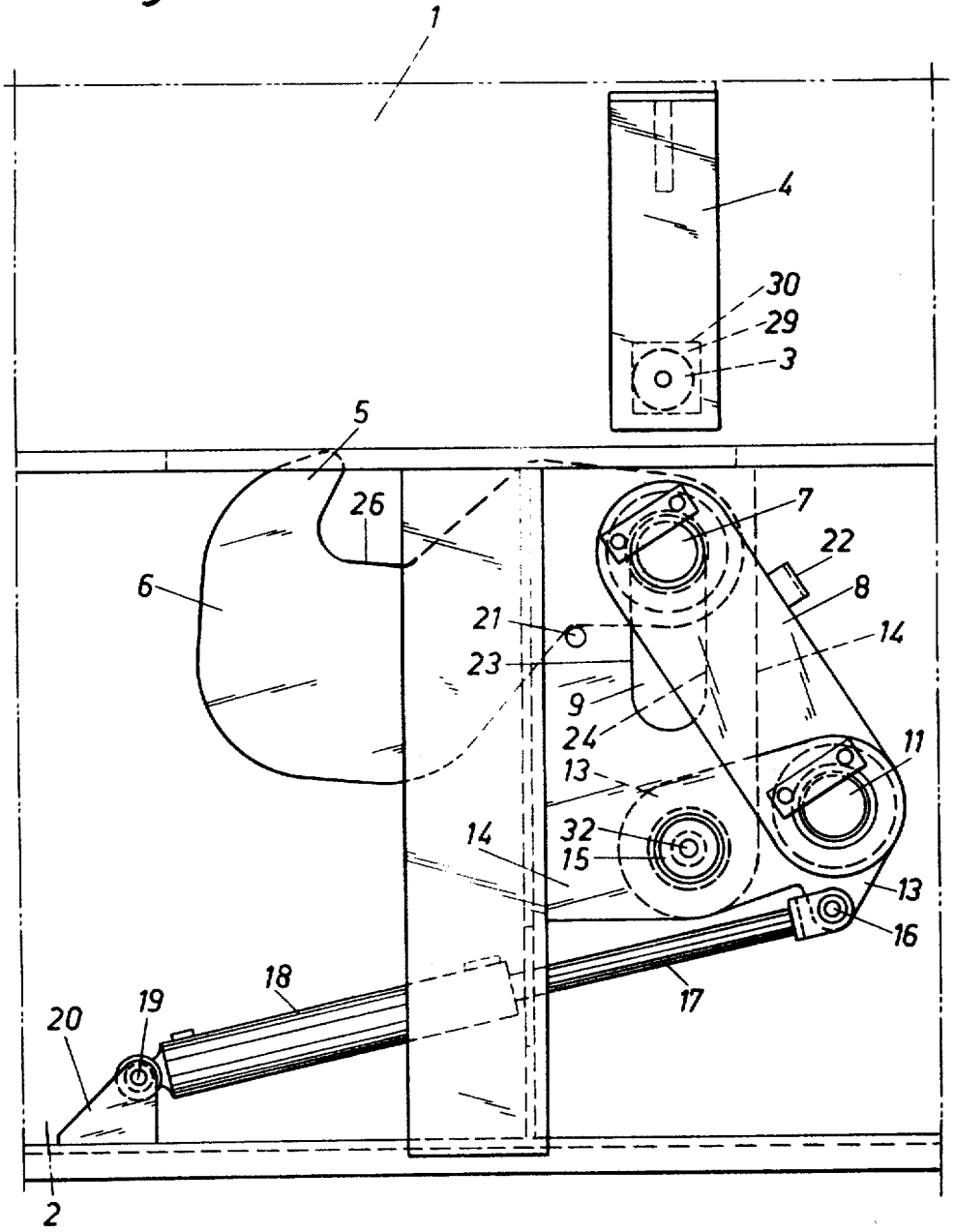
FIG. 3 is a side view similar to the one illustrated in FIG. 1 but shows the battening device in released position.
Figure 4:
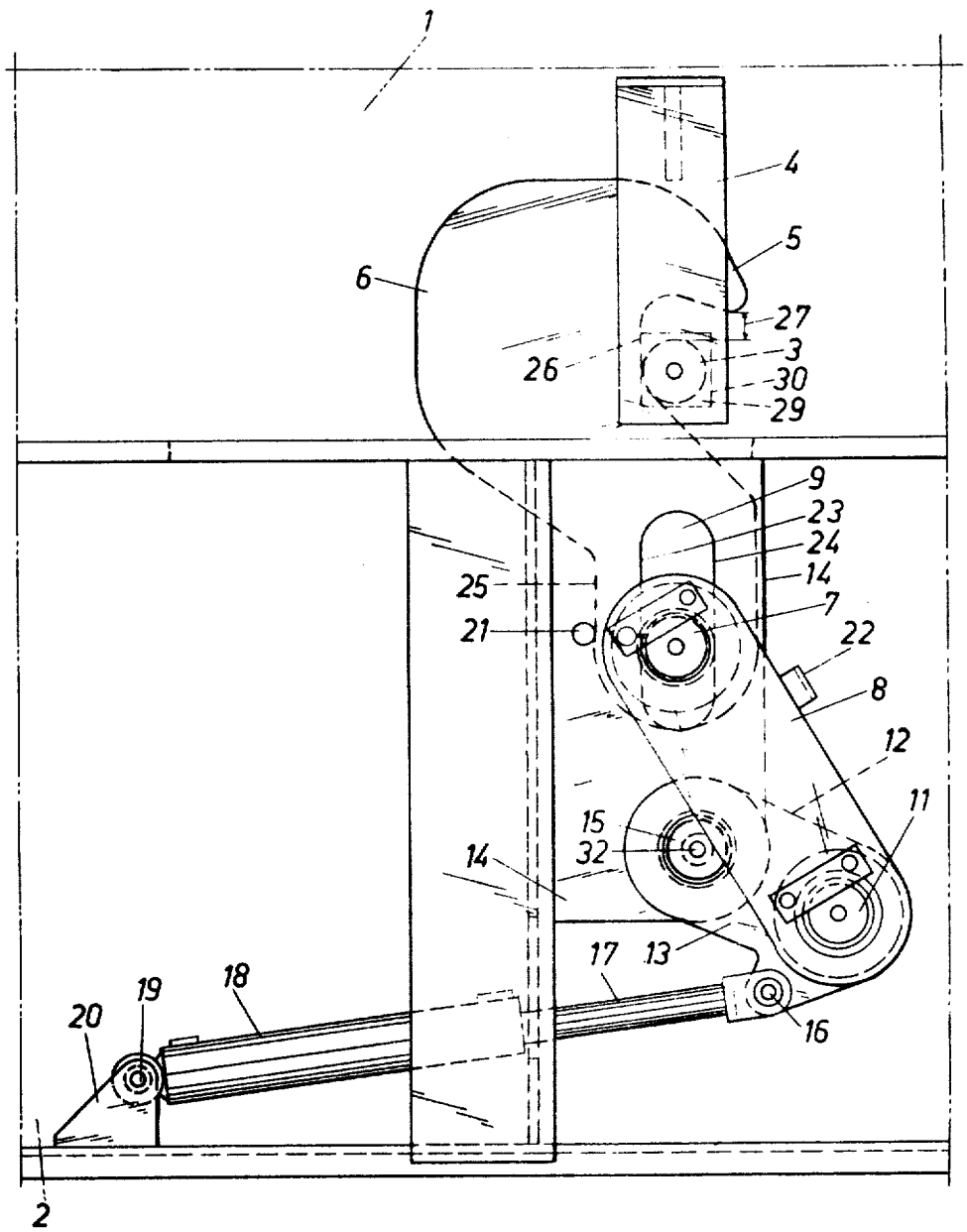
FIG. 4 is a side view of the battening device in the position it assumes immediately before the hook member is tightened.

FIG. 3 illustrates the battening device in release position wherein the hook member 6 rests against the guide pin 21 in swung-down position. When an hydraulic pressure is applied in the cylinder 18 at the right end thereof, the piston 17 is pulled inwards inside the cylinder, thus causing a swinging movement of the arm 13 in the clockwise direction. The link 8 is brought along in this movement and the lower end of said link is swung in clockwise direction while at the same time its upper end is pulled downwards, the ends of the pin 7 being guided in the lateral edges 23, 24 of the channels 9. Upon displacement of the pin 7 from the position illustrated in FIG. 3 to the lower position illustrated in FIG. 4, one of the curved edges of the hook member, i.e. the outer edge line 25, slides along the guide pin 21, whereby the inner edge 26 of the hook member portion 5 abuts against the hatch pin 3. In this position the hook portion 5 proper is at a comfortable distance 27 away from the hatch pin 3. Upon continued swinging movement in the clockwise direction of the arm 13 the pin 7 is displaced further downwards in the channels 9 whereby the hook portion 5 is urged against the hatch pin 3, pulling the hatch 1 down against a hatch sealing member 28 positioned between the hatch and the coaming. In the battening position (FIG. 1) the link 8 has been swung until the stopper means 22 abuts against the stays 14 in which case the imaginary line of connection 10a between the articulation points 7 and 11 is to the left of the centre of the pivot axis 15. In this position, the battening device is blocked.

To release the battening the above-mentioned movements are performed but in the opposite succession in that the link 8 in this case is displaced by the piston rod 17 in the counter-clockwise direction. At the end of the upwards movement of the pin 7 in the channels 9 the hook member 6 will swing counter-clockwise under the influence of the gravitational forces, and in doing so it will be supported by the guide pin 21 into the position illustrated in FIG. 3. The hatch 1 may now be lifted.

Figure 2:
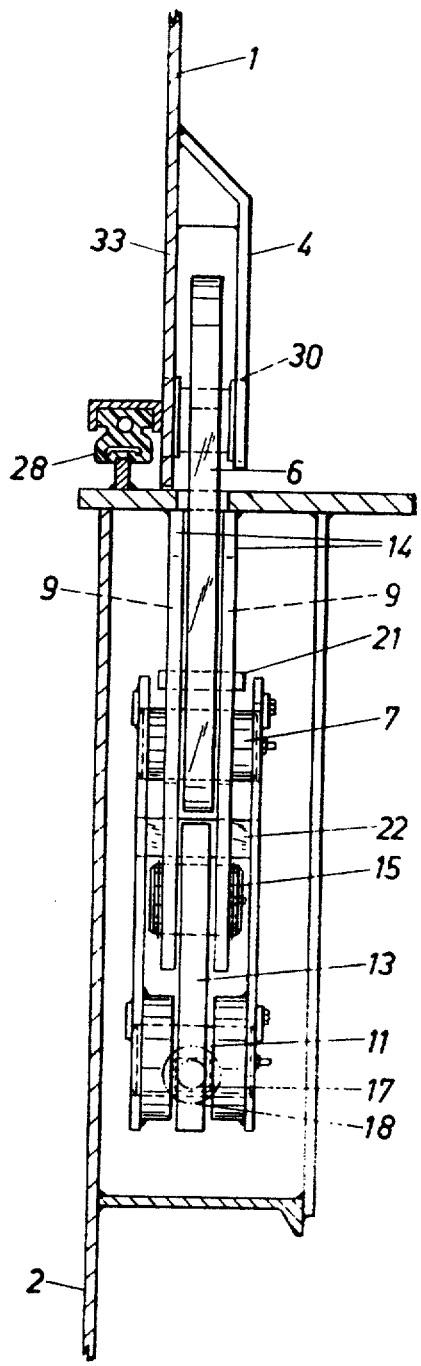
FIG. 2 is a vertical section along line II—II of FIG. 1.
Figure 5:
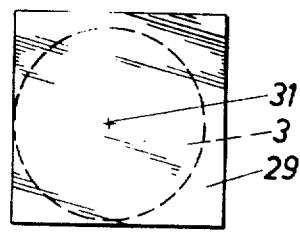
FIG. 5 illustrates on an enlarged scale an end view of the hatch pin in accordance with a preferred embodiment, and FIG. 6 a plan view of the same hatch pin.
Figure 6:
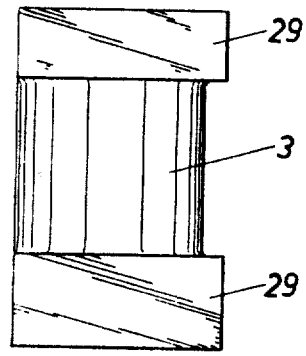

As illustrated particularly in FIGS. 5 and 6 the hatch pin 3 is arranged eccentrically with respect to its two end pieces 29, which are of square cross-sectional shape in the embodiment illustrated. The hatch mounting 4 is provided with a corresponding square aperture 30. When the battening device is to be assembled, the hatch pin 3 is inserted by means of its two end pieces 29, formed integral with said pin, through the aperture 3, it then being possible, on account of the eccentric arrangement of the pin 3, to adjust the distance between the centre of the hatch pin 31 and the centre 32 of the pivot axis 15 by turning the insert piece until the required tightening of the battening is obtained. When the insert piece 3, 29 has been set in correct turning position, it is welded to the mounting 4 and the wall 33 of the hatch 1 (FIG. 2).

The embodiment shown and illustrated is to be regarded as an example only and the various details and portions of the battening device may be constructively altered in a variety of ways within the scope of the appended claims. The channels 9 which in the drawings are shown formed in the stays 14 may be made in another stationary portion of the hatch coaming 2. The hatch pin 3 may be given a different configuration from the one illustrated in FIGS. 5 and 6. The end pieces 29 may have a polygonal shape differing from the one illustrated, e.g. a hexagonal shape.

What I claims is:

1. An improved hatch battening device particularly intended for cargo hatches on board ships, said hatch battening device comprising a pin fixed relative to said hatch, a hook member associated with a coaming carrying said hatch, said hook member having a hook portion at one end thereof adapted to engage over said pin, means for operating said hook member between a latched position and a released position comprising a source of power, an arm supported for pivotal movement about a fixed pivot point on the coaming, means operatively connecting said source of power and said arm for pivoting said arm upon operation of said source of power, a link, means pivotally connecting said link to said arm, means providing a pivotal connection between said link and said hook member, means providing a guide for said last mentioned pivotal connection for constraining the movement of said last pivotal connection in a vertical direction intersecting said pin, and means independent of said guide providing a fulcrum about which said hook member may pivot for guiding said hook member during the battening operation to effect movement of said hookshaped portion of said hook member first in a pivotal direction relative to the last pivotal connection and into contact with the pin and finally guiding said hook member in a vertical direction for guiding the final tightening movement of said hook member in a vertical direction to preclude pivotal movement of said hook member relative to said pin.

2. An improved hatch battening device as claimed in claim 1, comprising a stopper means to limit the swinging movement of said link during the battening operation to a position wherein an imaginary line connecting the two articulation points of said link has just passed over said pivot pin of said arm.

3. An improved hatch battening device as claimed in claim 1, comprising mutually uniform end pieces formed integral with said pin, said hatch pin being eccentrically positioned relative to said end pieces.

* * * * *